Patented Sept. 24, 1946

2,408,297

UNITED STATES PATENT OFFICE 2,408,297

BITUMINOUS COMPOSITIONS

Richard H. Cubberley, Ridgewood, and Frank W. Yeager, Englewood, N. J., assignors to The Patent and Licensing Corporation, New York, N. Y., a corporation of Massachusetts No Drawing. Application May 11, 1944, Serial No. 535,194

2 Claims. (Cl. 260—28)

This invention relates to compositions of normally solid, heat liquefiable bitumen, and is more particularly concerned with the provision of such compositions having properties and characteristics distinctly different from those originally possessed by the bitumen, whereby to render such compositions suitable for those types of applications where the bituminous material would otherwise be unsuitable.

One object of the present invention is to provide heat liquefiable asphaltic compositions characterized by a relatively high softening or melting point and by an unusually low viscosity at temperatures at which an asphalt of similar softening or melting point is normally highly viscous.

Another object is to provide asphaltic compositions in which the normally high adhesive strength of the asphalt is modified to a permanent, moderate tack.

A further object is to provide heat liquefiable asphaltic compositions which, while possessing high heat stability, i. e., they will not soften or tend to flow to any material extent at temperatures up to about 10° F. below the softening point of the asphalt, will also be flexible and non-brittle at temperatures at which the asphalt is normally brittle and inflexible.

The foregoing and related objects may be attained, in accordance with the present invention, by treating an asphalt in such manner, as will be more fully explained hereinafter, that those properties and characteristics of the asphalt which render it unsuitable for certain types of saturating, coating, adhesive and laminating applications will be permanently modified to the extent required for such applications.

A typical example of an asphalt which may be used in the practice of the present invention is a grade customarily used in the manufacture of roofing shingles and the like. This grade of asphalt may have a softening or melting point of 155° F., a penetration of 14 at 32° F., 36 at 77° F. and 79 at 115° F. Such an asphalt possesses a relatively high viscosity, for example, 680 C. P. S. at 300° F., and is a very sluggish material at such temperatures. Cooled and hardened films of this grade of asphalt are extremely brittle and inflexible at relatively low temperatures of say 0° F. and lower.

By adding to a quantity of the aforementioned grade of asphalt in heat liquefied condition a small proportion by weight of cetyl acetamide, several properties and characteristics of the asphalt are thereby radically altered. It has been found, for example, that the addition of only 5% cetyl acetamide will raise the softening point of the asphalt from 150–160° F. to 235–245° F., and, simultaneously, will cause the viscosity of the asphalt at 300° F. to be greatly reduced (i. e., to 350 C. P. S. at 300° F.). In addition to this radical lowering of the viscosity which renders the asphalt highly flowable at 300° F., it has been found that the thus modified asphalt will possess high heat stability, as indicated by a sharp softening point, and will not flow or soften to a material extent at temperatures up to approximately 10° F. below its adjusted softening point. Thus, in the example cited, the asphalt, having a softening point of 240° F. will not soften materially at 225–230° F.

The addition of cetyl acetamide to the asphalt also serves to block out or mask the inherent high adhesive property generally characteristic of all asphaltic surfaces. The modified asphalt is therefore suitable for use as a laminant and coating in the manufacture of certain types of laminated wrapping materials which are wound into rolls capable of being readily unwound as required for use. The desirable minimum amount of adhesion between layers of the wound wrapping material that are in direct contact with each other may be termed the "storage adhesion" characteristic of the material. It is noteworthy that the presence of the cetyl acetamide in the asphalt composition does not adversely affect the desired adhesion developed when the molten compound is brought into contact with the materials that are to be saturated and/or coated therewith, and then allowed to cool.

A commercial form of cetyl acetamide, which is a synthetic wax, is available on the market under the proprietary name of "Acrawax C." This synthetic wax has a softening point of approximately 280° F. and will increase the softening point of the foregoing grade of asphalt on an average of approximately 15° for each 1% of the material added.

The asphalt composition which has been modified in the manner above indicated may also be rendered flexible and non-brittle at temperatures of the order of 0° F. This may be accomplished by blending with the previously modified asphalt composition a small amount of a tacky, viscous substance which has a relatively high molecular weight, and which functions, in part, as a plasticizer for the asphalt. One example of this type of substance is a polyisobutylene compound having a molecular weight within the approximate range of 500–2500. Such compounds are commercially available under the trade name of "Vistac,"

The blending with the aforementioned asphalt composition, for example, of about 10% of Vistac No. 1 has been found to increase the penetration of the resulting composition from 15 to 21 at 32° F., without however materially affecting the softening point of the composition, viz. 235–245° F. The thus blended composition is flexible and non-brittle at temperatures as low as approximately 0° F. An unmodified asphalt of a grade having a similar softening point is characterized by a penetration of 0–3 at 32° F., and is exceedingly brittle at these low temperatures.

The presence of the Vistac in the asphalt composition also serves to lower the viscosity of the resultant composition still further, e. g., from 350 C. P. S. down to 280 C. P. S. at 300° F.

When the modified asphalt composition containing Vistac is used as a laminant and coating in the manufacture of wrapping material, the presence of the Vistac in the composition imparts to the wrapping material a most desirable characteristic which may be termed "operational tack." It is this particular characteristic which enables a material made with the composition of the present invention to adhere to itself under moderate manual pressure when applied as a wrapping around an article and overlapped upon itself.

In order to explain more clearly the unique properties of compositions made by modifying asphalt in the manner above described, several practical applications, for which the composition is readily adapted, will be described in detail. One such application is in the production of an adhesive wrapping material, wherein a sheet of suitable material, such as woven cotton sheeting, kraft paper or the like may be run through a vat containing the highly fluid composition heated to approximately 300° F. When this sheet emerges from the vat, a sheet of Cellophane, kraft paper, metal foil or similar material, which has at least its outer surface coated with the same composition, is laminated thereto by passing the two layers of material between a pair of combining rolls which press the layers together and squeeze out the excess of the composition. The laminated material is then permitted to cool slowly while travelling over suitably positioned rolls and is then convolutely wound up in rolls for storage or shipment.

The "storage adhesion" of the wrapping material made with the composition as above described is manifested by the ease with which the material may be unwound from the roll with application of normal amount of force and without damage to the material. Had an unmodified asphalt been used as the laminant and coating in the manufacture of the above-described material, the strongly adhesive character of the asphalt would have prevented the unwinding of the rolled material without tearing or otherwise damaging the material.

In using the laminated material as an adhesive wrapper, sheets of sufficient size are used to provide for an overlapping of the wrapping material upon itself when placed around an article being wrapped. The overlapping portions of the wrapping material are brought into contact with each other with the application of moderate manual pressure, thus developing "operational tack" in sufficient degree to hold the overlapping portions together. The wrapped article may be further protected, if desired, by sealing the overlapping portions of the wrapper by the application of heat in any suitable manner and by any suitable means. Because of the high softening point of the compound, the heat-sealed laps develop a firm bond.

Another practical application for which the composition of the present invention is particularly suited is for coating or lining the interior surfaces of containers or the like which are intended to be filled with substances at temperatures as high as about 10° F. below the softening point of the composition. In such types of application, the composition having a softening point of about 240° F. may be brought to highly fluid condition by heating it to approximately 300° F. and filling the container therewith and thereafter removing the excess as by draining, whereby a substantially uniform coating film of the composition remains on the interior surfaces, which will set and harden upon cooling. The low viscosity characteristic of the composition, even when it has cooled down to temperatures only about 20° F. above its softening point, permits the containers to be rapidly filled and then rapidly drained with a substantially uniform, continuous and relatively thin lining film remaining on the interior surfaces of the containers. The desired interior coating may be obtained, under such filling and draining conditions, even where the containers have interior fittings which present a number of irregular, discontinuous surfaces.

After the coating film has cooled and hardened, the container may be filled with the desired contents at a temperature as high as, say 220–230° F. By virtue of the heat stability of the lining, the contents may be poured into the container at temperatures as high as about 10° F. below the softening point of the lining composition without adversely affecting the lining, provided that the contents are not of themselves a solvent for asphalt.

Moreover, the coating provided by the present composition is quite flexible, as is indicated by its relatively high penetration at 32° F., even though possessing a high softening point, and is less likely to shatter or crack, when subjected to mechanical shock at temperatures of the order of 0° F. than would normally be the case with an unmodified asphalt of similar high softening point.

The present composition also possess other noteworthy characteristics, namely, its chemical inertness, non-corrosiveness, and resistance to water. These characteristics, normally inherently present in the unmodified asphalt, are preserved by reason of the selection of modifying agents, such as the synthetic wax and polyisobutylene above specified, which are themselves chemically inert, non-corrosive, and water resistant.

Satisfactory compositions of the present invention may be prepared using 73–95% asphalt having a softening point of approximately 155° F., 2–15% Acrawax C and 3–12% Vistac, these proportions being by weight of the compound. Other grades or types of asphalt, possessing either appreciably higher or appreciably lower softening points than the one indicated, may be modified by combining therewith the foregoing modifying agents in amounts, within the range above specified, depending upon the properties of the selected asphalt and upon the requirements of application.

There may be thus provided in accordance with the invention compositions consisting mainly of a relatively inexpensive bitumen which is rendered suitable for many types of applications as saturants, coatings, laminants and adhesives for which the bitumen in its unmodified form is entirely unsuitable.

We claim:

1. An adhesive, waterproof composition characterized by its high fluidity at a temperature as low as 20° F. above its softening point, heat stability at temperatures as high as about 10° F. below its softening point, chemical inertness, non-corrosiveness, and flexibility at temperatures as low as about 0° F., said composition comprising 73 to 95% of a normally solid asphalt, 2 to 15% of cetyl acetamide wax, and 3 to 12% of a polyisobutlyene having a molecular weight within the range of approximately 500–2500.

2. An adhesive, waterproof composition having a softening point of 235–245° F. and characterized by its high fluidity at 260–300° F., heat stability at temperatures as high as about 225° F., chemical inertness, non-corrosiveness, and flexibility at temperatures as low as about 0° F., said composition comprising 73–95% asphalt normally having a softening point of approximately 155° F. and a penetration of about 36 at 77° F., 2–15% cetyl acetamide wax and 3–12% of a polyisobutylene having a molecular weight within the range of approximately 500–2500.

RICHARD H. CUBBERLEY.
FRANK W. YEAGER.